Dec. 11, 1934.     D. H. WESLEY     1,984,294
VENTILATING SYSTEM
Filed Sept. 9, 1931     3 Sheets-Sheet 1
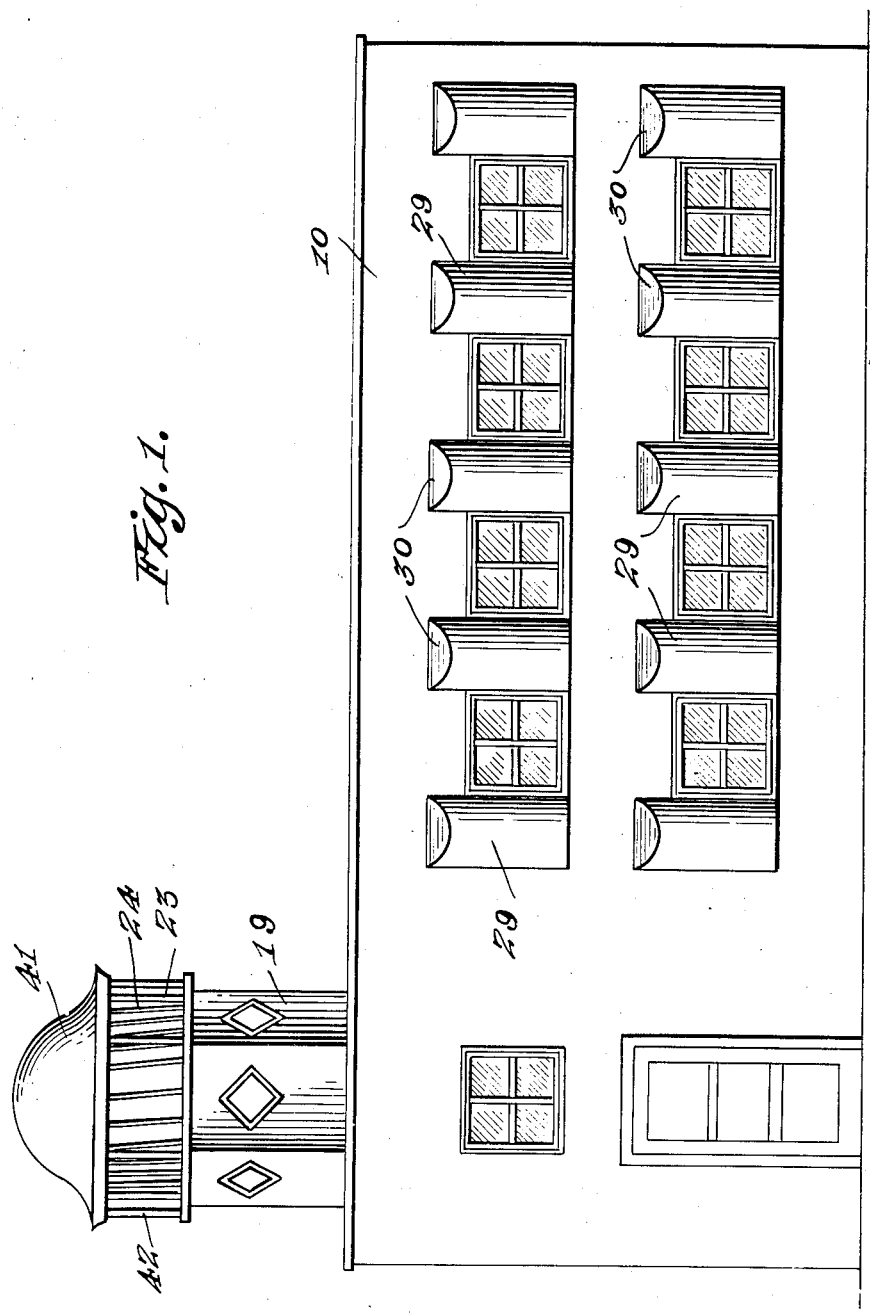
Dell H. Wesley,
INVENTOR
BY Victor J. Evans & Co.
ATTORNEY

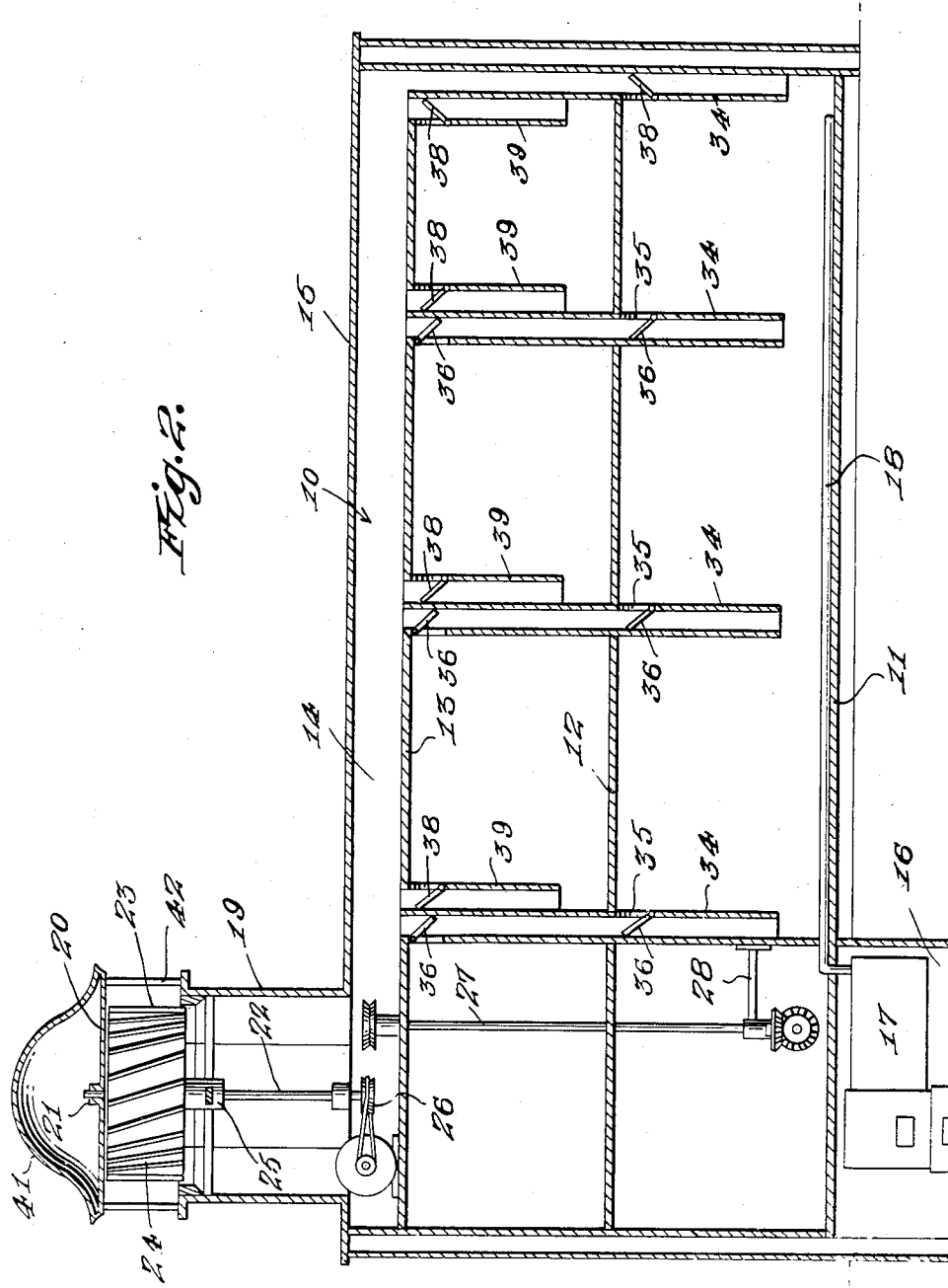

Dec. 11, 1934.  D. H. WESLEY  1,984,294
VENTILATING SYSTEM
Filed Sept. 9, 1931   3 Sheets-Sheet 3
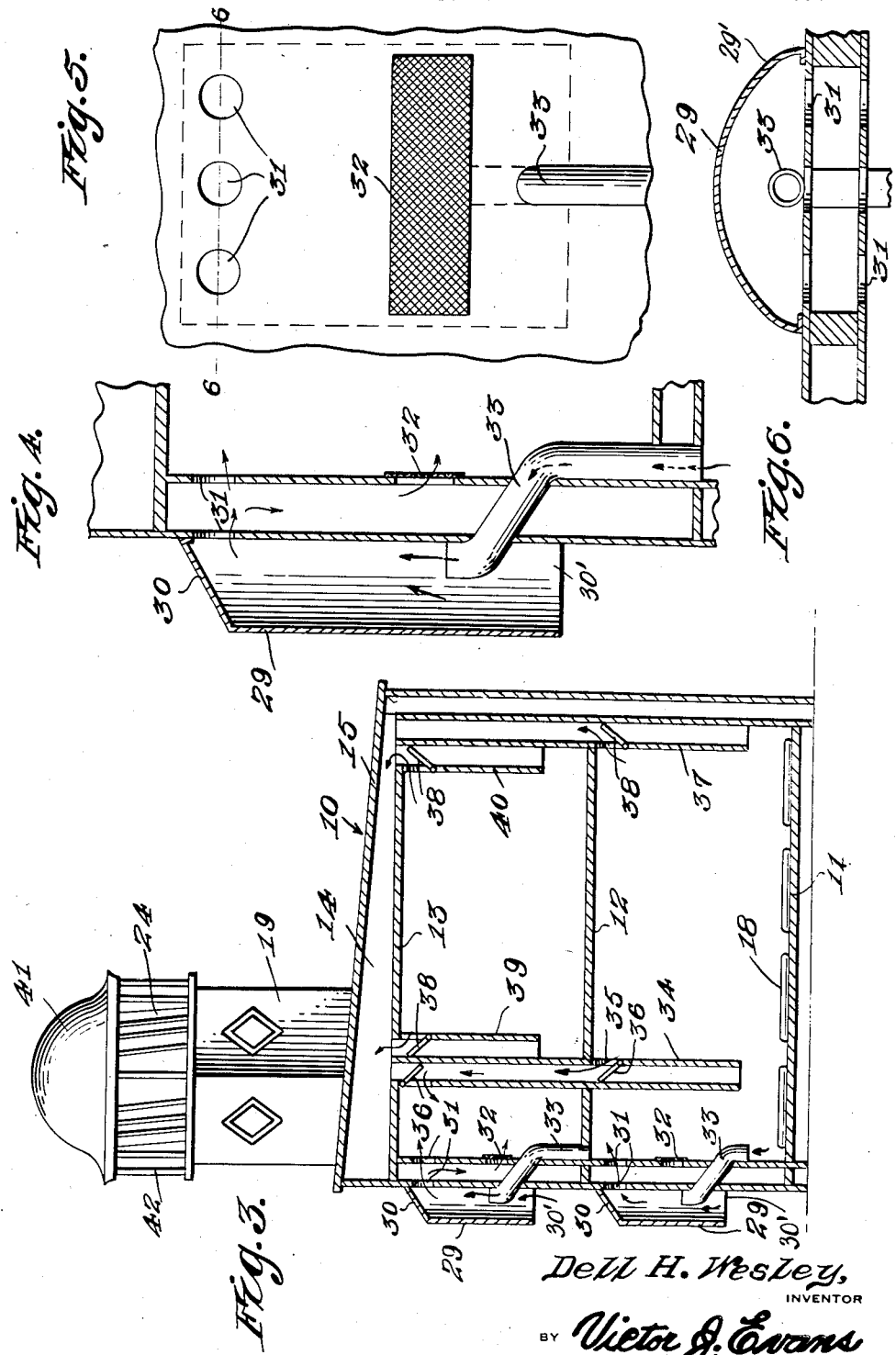

Patented Dec. 11, 1934

1,984,294

UNITED STATES PATENT OFFICE 1,984,294

VENTILATING SYSTEM

Dell H. Wesley, Mardela Springs, Md.

Application September 9, 1931, Serial No. 561,929

1 Claim. (Cl. 98—33)

This invention relates to ventilating systems for poultry and other houses.

An object of the invention consists of ventilator elements which create draft action through the walls of the building structure commensurate with the temperature or degree of the sun rays upon the exposed surface thereof.

A further object of the invention contemplates the provision and arrangement of flues or conduits for conveying heated air from one floor of the building to the other and to convey spent or foul air through the roof structure of the building to the turbine ventilating element.

With the above and other objects in view, the invention further consists of the following novel features and details of construction, to be hereinafter more fully described, illustrated in the accompanying drawings and pointed out in the appended claims.

In the drawings:

Figure 1 is a side elevation of the self-ventilating poultry house.

Figure 2 is a longitudinal sectional view taken therethrough.

Figure 3 is a transverse sectional view taken through the poultry house.

Figure 4 is an enlarged fragmentary longitudinal sectional view taken through a portion of the building structure and one of the sun actuated ventilating elements.

Figure 5 is a fragmentary elevation of the inner wall of the poultry house at right angles to the Figure 4 illustration.

Figure 6 is a sectional view taken on line 6—6 of Figure 5.

Referring to the drawings in detail wherein like characters of reference denote corresponding parts, the reference character 10 indicates generally a poultry house of elongated contour having a main floor 11, a second floor 12 and a sub-roof 13 to define an unobstructed passageway 14 between the subroofing and the roof 15 proper, for purposes to be better understood in the following description of the invention.

A pit 16 is arranged beneath the main floor 11 for the purpose of housing a heating unit or plant 17 for heating a coil 18 disposed in juxtaposition to the main floor 11. A housing member 19, supported by and upstanding from the roof 15, carries an auxiliary partition 20 within the top thereof including a sleeve 21 for journally accommodating the shaft 22 of a turbine ventilating element 23. The latter is of drum formation and provided with radially projecting and obliquely pitched vanes or fins 24. A spider 25, carried within the housing 19, provides a seat for the ventilating element per se and a guide for the depending portion of the shaft 22. A pulley wheel 26 is carried upon the lowermost end of the shaft 22 and designed for drive connection with either the armature shaft of a motor or a driven shaft 27 having a power take-off mechanism 28 for the operation of machinery or the like incidental to the maintenance of the poultry house, i. e., the preparation of food stuffs and the like. In extremely hot weather it may be found necessary to actuate the turbine by the motor in order that ventilating of the poultry house will be accelerated.

The sun actuated ventilating elements, alluded to in the foregoing, consist of members 29 of substantially segment shape in cross section having the side edges thereof arranged flush with the outer side of the building structure adjacent the windows therefor.

The ventilators 29, better illustrated in Figure 1, are disposed in spaced superposed relation with respect to one another, and exteriorly of the dwelling. The upper ends of the ventilators 29 are provided with an upper end wall or top 30, sloped in a downward and outward inclined direction. The front wall 29' is of substantially segment shape in cross section and presents the ventilators with an exposed outer surface for the full benefit of the sun's rays. Of course, it will be understood, in view of the configuration of the front or outermost wall 29' of the ventilator being of substantially segment form in cross section, and the specific mounting or position of the top 30, the ventilators 29 are allowed to more readily act in an efficient and satisfactory manner to facilitate the admission of fresh air, induced in the lower open ends 30' of each of the ventilators 29, when the ventilators are subjected to the heat rays of the sun. The outer and inner walls of the building or structure, at a point adjacent the auxiliary ceiling 13 thereof, are provided with transversely aligned communicating openings 31 whereby fresh air passing upwardly through the ventilators 29, is permitted to enter the interior of the structure. The air entering the structure through the open ends 31 of each of the ventilators 29, circulates or travels downwardly between the outer and inner walls and thence outwardly within the structure through the screens 32. Screens 32 cover auxiliary openings also provided in the inner wall of the building structure for communication with the compartments defined between the mentioned walls. Some of the conduits 33 project through the inner and outer walls of the building structure and have their innermost ends spaced from the floor of the immediate room whereas others, that is in the upper compartment or room, have their lowermost ends projected downwardly through the floor 12 to accelerate the ventilating of the upper compartment more speedily than the lower compartment or floor, being that the heat will have a natural tendency to rise and collect within the upper floor or compartment. These conduits 33 discharge a certain portion of the foul air within the ventilators and partially mix with the fresh air prior to its entrance in the inlet openings 31 and the discharge thereof into the air space or compartment 14. Elongated conduits 34, vertically disposed within the poultry house having communication at their uppermost ends with the compartment 14, are projected downwardly therefrom and extended through the floor 12 within the lower compartment or room, substantially as illustrated in Figures 2 and 3 of the drawings. These conduits have passageways 35 in the walls thereof in communication with the rooms adjacent the ceilings thereof and are controlled by damper valves 36 which are of such lengths as to prohibit their being disposed transversely of the bores of the elongated conduits 34 for the purpose of deflecting the air, when in an open position, whereby the heat from the coils 18 within the lower compartment or room will be conveyed upwardly through the openings 35 and deflected against the upper side of the lower valve and the lower side of the upper valve whereby the upper floor or compartment will be heated.

Auxiliary or complemental elongated conduits 37, arranged adjacent the rear walls of the building, are provided with single damper valves 38 located adjacent the ceiling of the lowermost room or compartment whereby heat may be conveyed directly from the heating coils 18 to the compartment 14 pursuant to the maintenance of a predetermined temperature within the room.

Each of the elongated conduits 34 and 37 respectively are provided with relatively short auxiliary conduits 39 and 40 respectively which carry damper valves 38 whereby the air within the upper room or compartment may be carried off from a point adjacent to the floor level or at points adjacent the ceiling in the manner contemplated for the lower floor. In this manner, both floors may be kept at the same temperature or radical temperatures according to the position of the damper valves and the age and condition of the poultry upon the different floors. For instance, brooders may be operated upon the lower floor and mature poultry may be housed within the upper compartment. The two rooms below the housing 19 are utilized as feeding rooms whereby the atmosphere within the living quarters for the poultry will not be rendered rancid by left-over or spoiled food. The foregoing contention would be possible in cases where the rooms were excessively heated.

The partition 20 above the turbine ventilating element 23 carries a dome 41 and the assembly of which is supported in spaced relation to the housing 19 proper by standards 42 which facilitates the exposing of the vanes 24 to the atmosphere.

The invention is susceptible of various changes in its form, proportions and minor details of construction and the right is herein reserved to make such changes as properly fall within the scope of the appended claim.

Having described the invention, what is claimed is:

A ventilating system for poultry houses having multiple floors and a heat collecting and conveying compartment beneath the roof thereof, elongated conduits communicating with the lowermost room and the heat collecting and conveying compartment, relatively short conduits establishing connection between the heat collecting and conveying compartment and the upper room, damper valves included within the conduits for controlling the flow of air therethrough from the rooms to the mentioned compartment and between said rooms, and ventilating members exteriorly mounted upon the poultry house and open at their lower ends, the walls of the poultry house having transversely aligned inlet openings for establishing communication between the ventilating members and rooms.

DELL H. WESLEY.